United States Patent [19]

Lee et al.

[11] Patent Number: 5,177,182
[45] Date of Patent: Jan. 5, 1993

[54] CURING OF POLYSULPHIDES

[75] Inventors: Timothy C. P. Lee, Kenilworth; George B. Lowe, Anstey; Raymond Robinson, Wyken, all of Great Britain

[73] Assignee: Morton International Limited, Coventry, England

[21] Appl. No.: 572,941

[22] PCT Filed: Jan. 2, 1990

[86] PCT No.: PCT/GB90/00001
§ 371 Date: Nov. 5, 1990
§ 102(e) Date: Nov. 5, 1990

[87] PCT Pub. No.: WO90/07539
PCT Pub. Date: Jul. 12, 1990

[30] Foreign Application Priority Data

Jan. 3, 1989 [GB] United Kingdom ............... 8900028

[51] Int. Cl.⁵ ............... C08G 75/04; C08G 75/00; C08J 3/00
[52] U.S. Cl. ............... 528/374; 524/700; 528/373
[58] Field of Search ............... 528/374, 373; 524/700

[56] References Cited

U.S. PATENT DOCUMENTS

| 3,349,046 | 10/1967 | Sheard | 528/171 |
| 3,991,039 | 11/1976 | Gunter et al. | 260/33.6 R |
| 3,997,613 | 12/1976 | Lenke | 528/373 |

FOREIGN PATENT DOCUMENTS 0153442 9/1985
WO90/07539 7/1990 PCT Int'l Appl.
1158685 7/1969 United Kingdom.

Primary Examiner—John Kight, III
Assistant Examiner—T. Mosley
Attorney, Agent, or Firm—Mark F. LaMarre; Gerald K. White

[57] ABSTRACT

A process for the manufacture of a partially cured polysulphide composition is provided, the curing of which is completed upon exposure of the composition to atmospheric moisture. The process comprises mixing a prepolymer with a water activatable curing agent and subjecting the composition to a partial cure with water. The reaction is then stopped by rapid dehydration after the initial induction stage of the reaction prior to the rapid increase in the viscosity of the composition. Curing of the composition is then completed by exposing the composition to atmospheric moisture.

10 Claims, 9 Drawing Sheets

CURING OF POLYSULPHIDES

This invention relates to the manufacture of polysulphide compositions of the type used, for example, as sealants in glazing and in other applications in the construction industry.

In preparing polysulphide sealants, a mercaptanterminated polymer, generally a liquid polysulphide of relatively low molecular weight, is reacted with a curing agent, preferably an oxidising agent such as calcium peroxide, to cure it to a solid state. The preferred liquid polysulphide polymers are those having a molecular weight of 1000-8000, a viscosity of 10 to 2000 poise and a degree of crosslinking of 2.0 or less. The preferred polymers are those prepared by Morton Thiokol Inc. and known as LP-2, LP-32 etc. The chemistry embodied in this reaction applies to all mercaptan terminated liquid polymers.

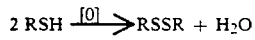

Curing agents such as calcium peroxide require the presence of water to activate them. It is therefore possible, instead of using a cumbersome two-part sealant composition, to use a one-part composition of liquid polysulphide and curing agent which is kept free of water until used. Once the sealant is in place it forms a skin and slowly cures to a rubber state through the presence of atmospheric moisture.

One known polysulphide composition comprises 100 parts by weight of liquid polysulphide LP32C (Morton International Inc) and 10 parts by weight of calcium peroxide. Such a composition generally takes several days to cure, having a skin time of 72 hours or more. To cure such a composition in a shorter time requires a temperature of 25° C. or more and a relative humidity of 95%.

There is therefore a need for polysulphide sealant compositions which can be easily prepared, are stable during storage and which cure in a short time once in position.

The inventors have found that when polysulphides are cured with a curing agent, for example with a strong oxidising agent such as a metal peroxide, the cure generally proceeds in three distinct stages.

The stages are:
(I) Induction—when little increase in viscosity is noted.
(II) Chain extension and cross linking—when the viscosity rises rapidly and the system approaches the gel state.
(III) Final cure—The viscosity is beyond the measuring limits of the viscometer. The final stages of polymer network formation take place.

The precise shape of the viscosity-time curve is dependent on many factors such as catalyst type, catalyst level, temperature etc.

The time required for the induction step (I) can vary considerably but in many cases, for example single part sealants based on polysulphide polymers and cured with calcium peroxide, this first step is very long. This is advantageous with respect to storage stability, but a disadvantage after application with respect to rate of cure. The reaction between polysulphide polymers and metal peroxides are catalysed by water and as such can be retarded to substantially a zero rate by dehydration.

The present invention consists in a method of making a polysulphide composition wherein a prepolymer having free mercaptan groups is mixed with a curing agent of a type activated by water, characterized in that the composition is subjected to a partial cure with water, the reaction then being stopped by dehydration.

The invention thus provides a technique which allows the reaction to proceed along the path of step I, induction, to a point just prior to commencement of Step II and no further.

At the completion of Step I the reaction is stopped by rapid dehydration, preferably by the use of molecular sieve. The subsequent exposure of this system to moist air reinitiates the reaction at the commencement of Step II, i.e. there is no longer an induction period.

Suitable molecular sieve types include types 3A, 4A, 13X and 14X.

The stabilised polysulphide polymer, which has reached the end of the induction step is hereafter referred to as "Prereacted" LP polysulphide polymer.

It is possible by the means described above to make stable prereacted LP polymers using ingredients commonly found in single part polysulphide sealants. These polymers blended with other ingredients form sealants which cure more rapidly than conventional polysulphide sealants.

The liquid polysulphides preferred for the purposes of the invention have the general formula:

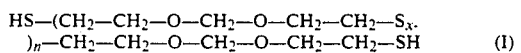

(I)

wherein x is from 2 to 5 and n is from 10 to 45.

The preferred curing agent is calcium peroxide, but other inorganic or organic oxidizing agents may be used, for example:
Urea hydrogen peroxide;
Sodium perborate monohydrate;
Sodium perborate tetrahydrate;
Sodium peroxide;
Manganese dioxide.

Preferred embodiments of the invention will now be described with reference to the accompanying drawings wherein.

Figure 1:
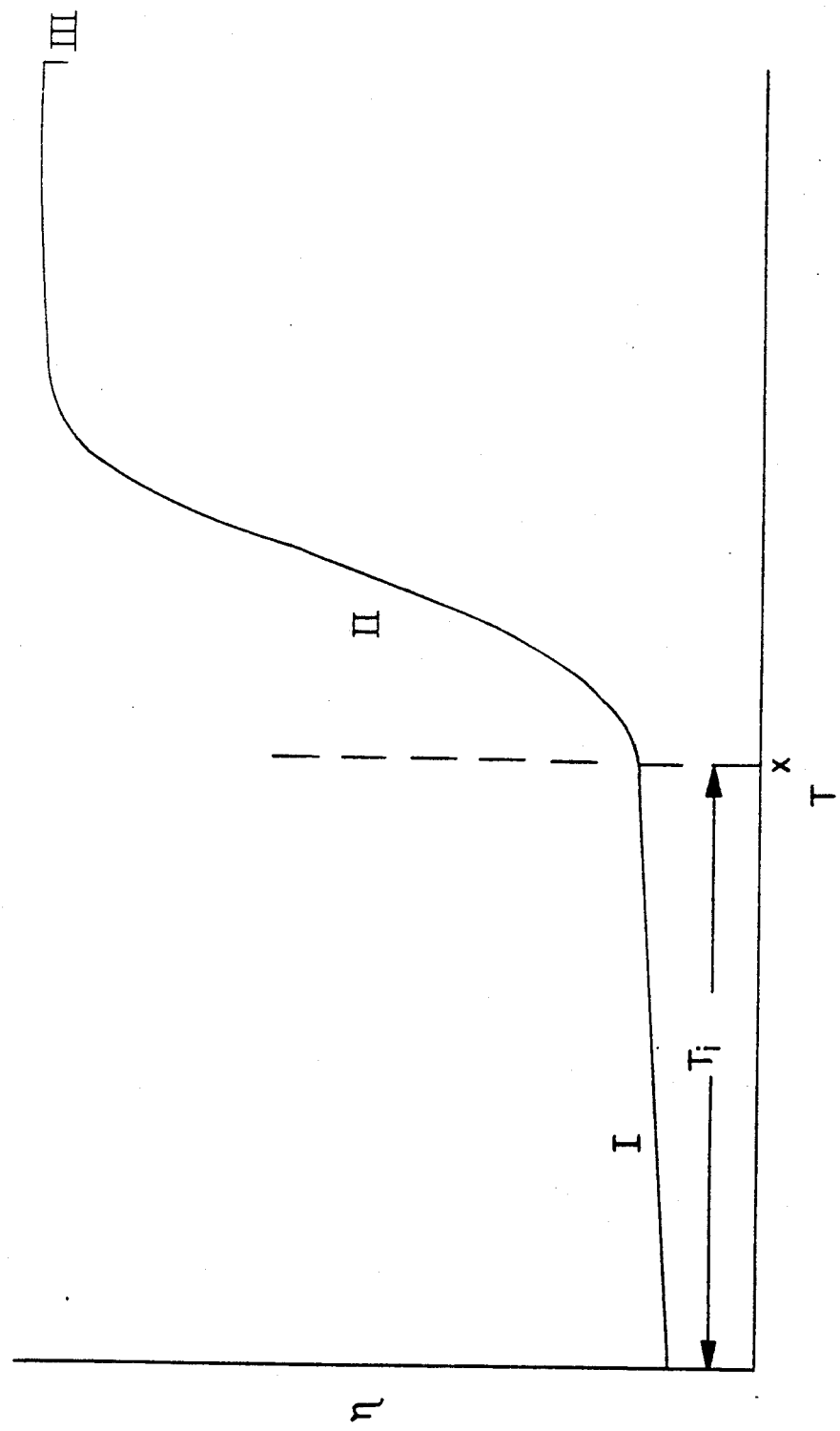
FIG. 1 shows by means of a viscosity-time curve the course of curing of a typical polysulphide.

Referring first to FIG. 1, viscosity is plotted against time for a calcium peroxide-cured liquid polysulphide sealant such as LP32c. It can be seen from this that during stage I the viscosity does not rise significantly. The viscosity then rises rapidly in stage II and levels off as the system approaches stage III, the final cure. The viscosity eventually becomes so great that it cannot be measured and the sealant solidifies.

The principle underlaying the invention is to add a controlled amount of water to allow the system to cure as far as the dotted line, which corresponds to the end of the induction period Ti. This period is typically about 2 hours but can vary considerably. At the end of the induction period the cure is stopped by means of a desiccant to give a partially liquid polysulphide which is stable provided it is kept dry.

It has been unexpectedly found that such a prereacted system when re-exposed to moist air and optionally a further curing agent, cures more quickly than a system of similar formulation using conventional polymers. Thus the prereaction not only gives a fast initiation of cure but appears to render the system self-catalyzing.

The partial cure can be stopped at the end of the induction period by the addition of a desiccant such as a molecular sieve desiccant. The precise length of the induction period can be adjusted by varying the amount of curing agent used and by the use of the desiccant. It has been found that instead of the 10 parts of calcium peroxide per 100 parts of polysulphide conventionally used, 20 to 40% of this amount can be used to give a stable partially cured product which can then be cured rapidly on exposure to atmospheric moisture.

Preferred embodiments of the invention will be described in more detail in the following examples.

In most of the examples the liquid polysulphide used is LP32c, mentioned above. This has the general formula (I) above, with the following particular parameters:

x (average) = 2.25
n (average) = 22
% branching = 0.5
Viscosity = 470 poise
Molecular weight (Mn) = 4000.

EXAMPLE 1

A test composition was made up using polysulphide LP32c one hundred wt. parts, calcium peroxide 10 wt. parts, water 2 wt. parts. This was found to have an induction period of 2 hours, a skin time of 2 hours 50 m, minutes and a full cure of about 24 hours. (In the absence of water the induction period is approximately seven days and full cure takes several weeks).

The above formulation was allowed to react for one hour 50 minutes, and the reaction was then stopped by the addition of 10 wt. parts of molecular sieve desiccant. The formulation so prepared was stored in an air tight container, with no air space. Upon reexposure to air, the skinning time of the partially reacted formulation was 10 minutes only.

EXAMPLE 2

For the purpose of preparing the prereacted polysulphide it was considered that 10 parts of calcium peroxide might be excessive. Therefore, a series of experiments at different levels of $CaO_2$ were carried out in which stability and subsequent reactivity were examined.

|  | Test No: | | | | |
|---|---|---|---|---|---|
|  | 13 | 14 | 15 | 16 | 17 |
| LP32c | 100 | 100 | 100 | 100 | 100 |

-continued

|  | Test No: | | | | |
|---|---|---|---|---|---|
|  | 13 | 14 | 15 | 16 | 17 |
| Calcium peroxide | 8 | 6 | 4 | 2 | 0 |

The level of stability was found to be related to the level of calcium peroxide (not unexpected) but the lowest level of calcium peroxide found to give catalytic cure was 4%. This was shown to be effective not only with further additions of calcium peroxide, but also with other oxidisers such as sodium perborate and urea hydrogen peroxide.

EXAMPLE 3

A liquid polysulphide composition was made up as follows:
Polysulphide LP32c—100 wt. parts
$MnO_2$ curing agent—10 wt. parts
Plasticizer HB 40—10 wt. parts
Tetramethyl thiuram disulphide (TMTD)—0-0.5 wt. parts.

Figure 2:
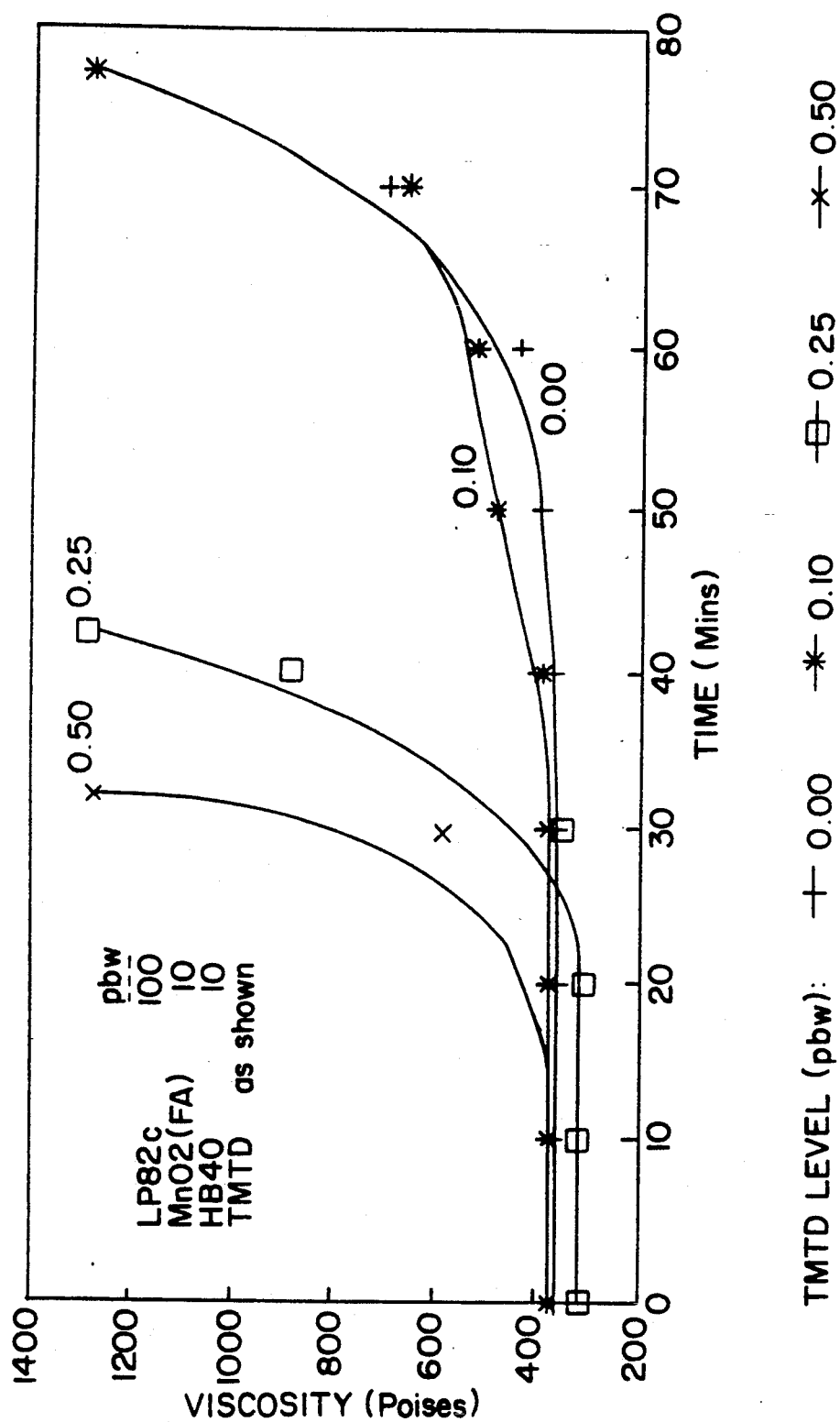
FIG. 2 shows the induction and cross linking stages and how they are influenced by catalyst levels.

The viscosity was monitored and plotted against time for four examples with different TMTD contents, the results being shown in FIG. 2. It can be seen from this graph that in the absence of TMTD the system has an induction time of 40-50 minutes, and the addition of 0.1 wt. % TMTD, based on the polysulphide, makes little difference to this. The addition of 0.25 wt. % of TMTD reduces the induction time to about 20 minutes and the addition of 0.5 wt. % reduces it still further to about 15 minutes.

EXAMPLE 4

Figure 3:
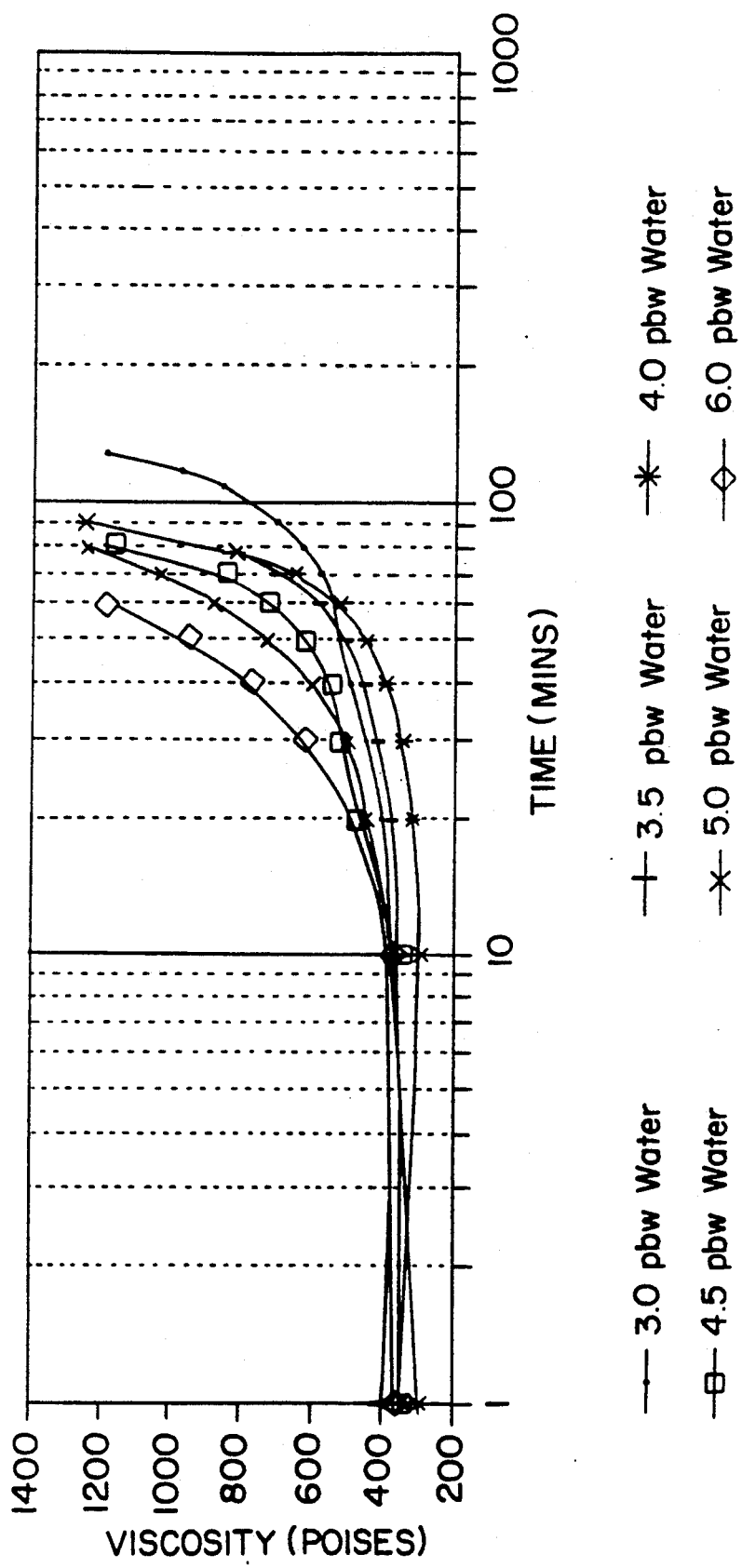
FIG. 3 illustrates how viscosity increases with time for six sealant/curing agent systems with different water contingents.
Figure 4:
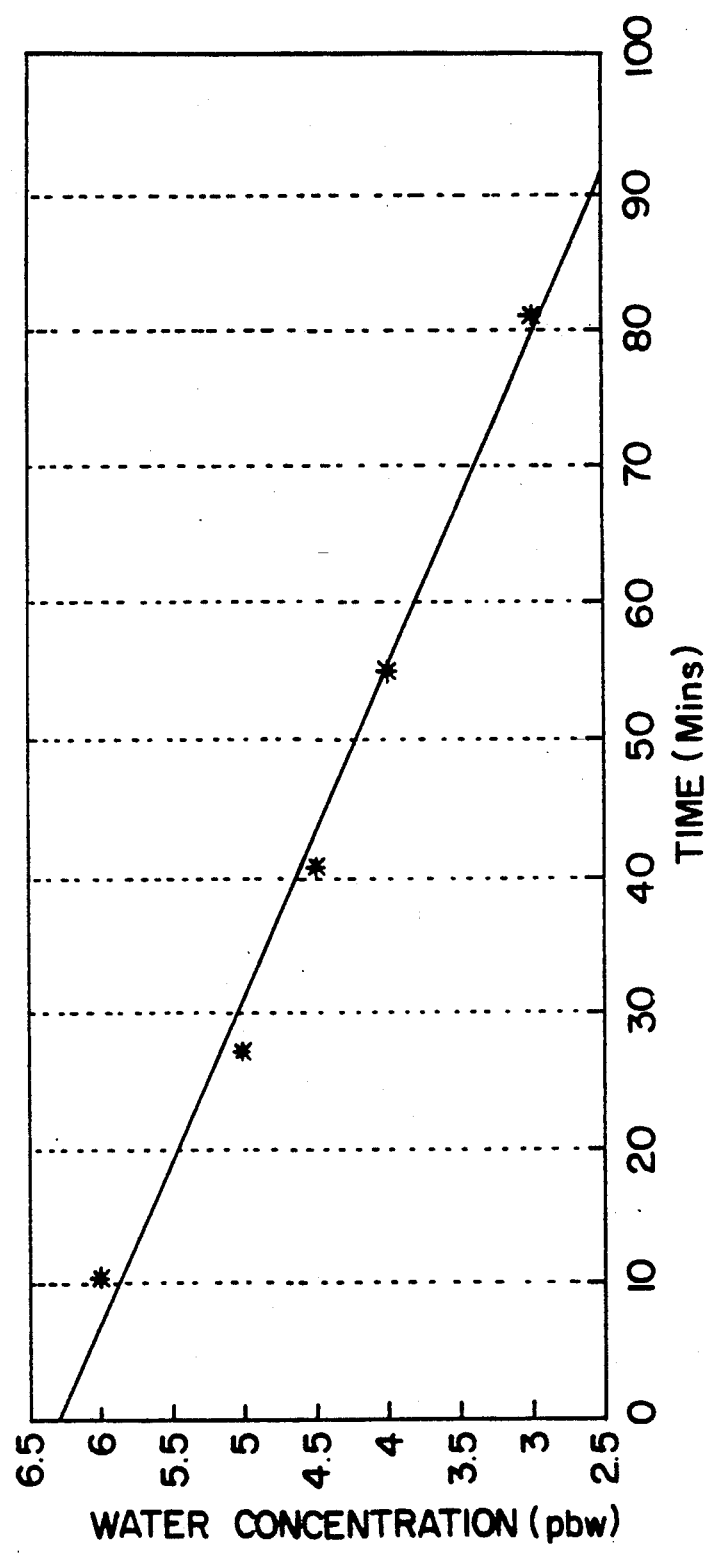
FIG. 4 shows directly how the induction time varies with water content.

In an LP32c/calcium peroxide system, water was added in amounts of 3 to 6 wt. % based on the polysulphide, to initiate the induction stage of the cure. Viscosity was plotted against time for six samples, and the results are shown in FIG. 3. By adding 6 wt. % of water the length of the induction stage can be reduced to 10 minutes. The relationship between water content and induction time is shown more directly in FIG. 4.

EXAMPLE 5

Compositions similar to those of Example 4 were made up using the following different liquid polysulphides, to establish the relationship between the degree of crosslinking of the polymer and the induction time:

| Liquid polysulphide | % cross linking. |
|---|---|
| LP 541 | 0.0 |
| LP 32c | 0.5 |
| LP 2c | 2.0 |
| LP 1805 | 4.0 |

Figure 5:
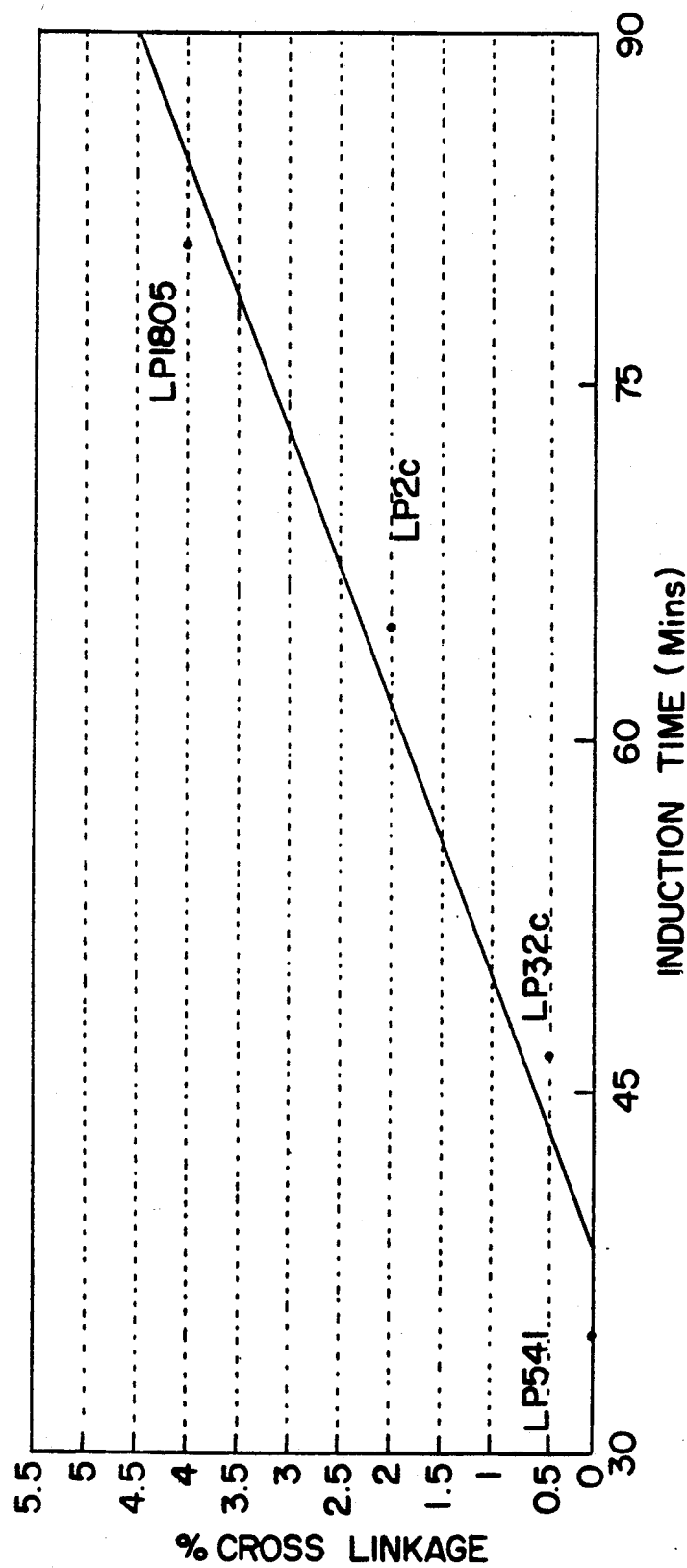
FIG. 5 shows how the induction time varies with the degree of cross-linking.

The results are shown in FIG. 5, wherein it can be seen that the induction time increases as the degree of cross linking increases.

EXAMPLE 6

Tests similar to those of Example 5 were carried out using the following polymers having different chain lengths, to establish the relationship between molecular weight and induction time:

| Liquid Polysulphide | n (formula 1) |
| --- | --- |
| ZL 980 | 14 |
| ZL 981 | 16 |
| ZL 982 | 22 |
| LP (OP1) | 29 |

Figure 6:
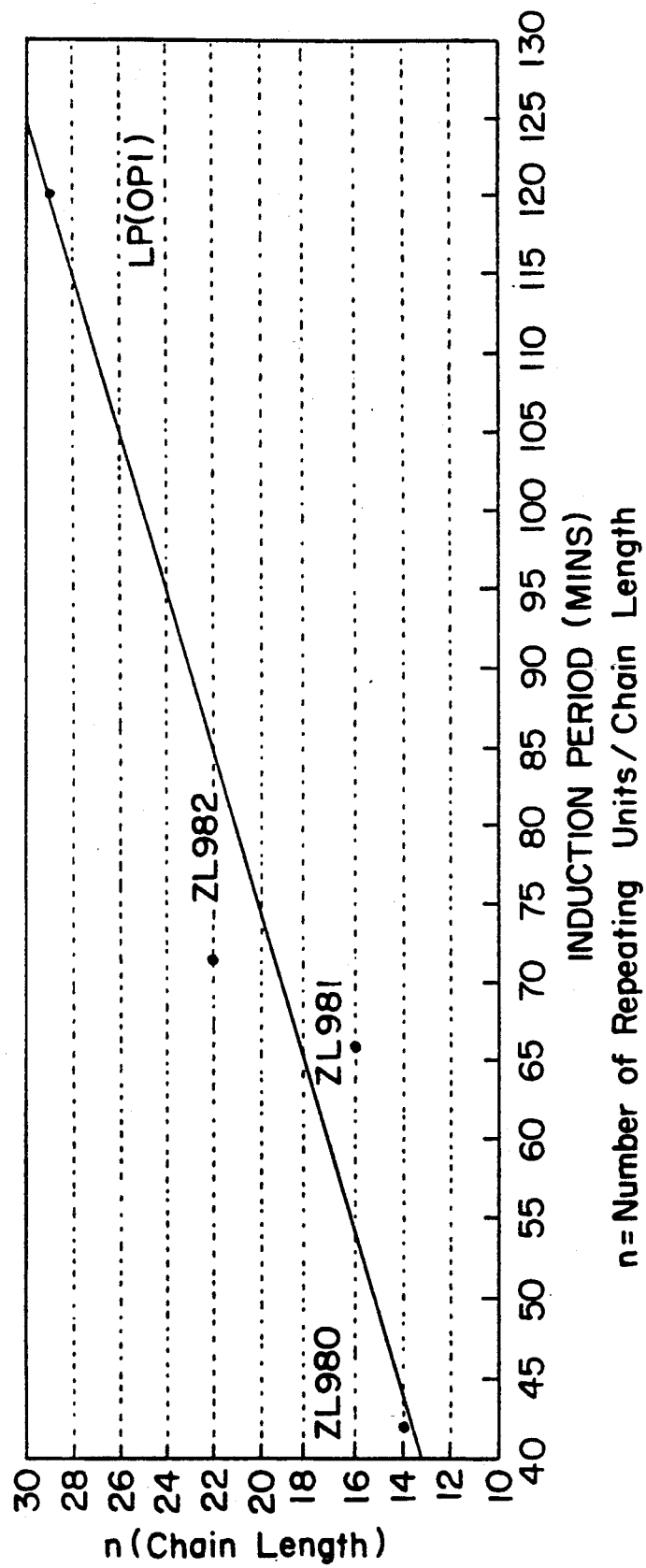
FIG. 6 shows how the induction time varies with the chain length of the polysulphide.

The results are shown in FIG. 6.

It can be seen from FIG. 6 that as the chain length increases the induction period also increases, from about 40 minutes up to 2 hours or more.

EXAMPLE 7

Induction Period

Figure 7:
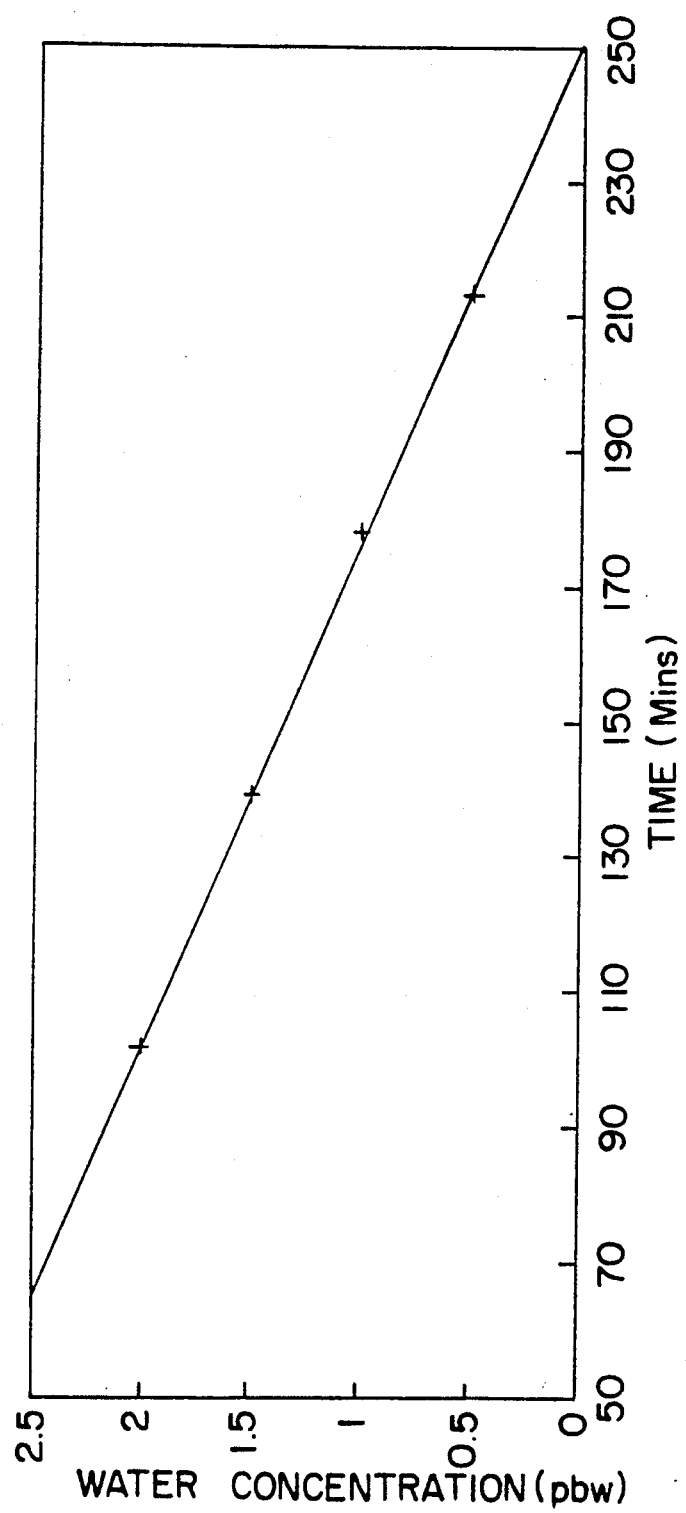
FIG. 7 shows how the induction time varies with water content.

Prior to making up stability trial samples an experiment was carried out to establish the induction time at different water addition levels for the particular materials being used. The results are shown in FIG. 7. The formulations used in this trial are as outlined in 1 to 12 in Example 8 below, without the molecular sieve. A linear relationship between water content and induction time was found, as in Example 4.

EXAMPLE 8

Stability

The following formulations were prepared to assess the stability of prereacted polysulphide polymers.

| | Test Number | | | | | | |
| --- | --- | --- | --- | --- | --- | --- | --- |
| | 1 | 2 | 3 | 4 | 5 | 6 | 7 |
| LP32c | 100 | 100 | 100 | 100 | 100 | 100 | 100 |
| Calcium Peroxide | 10 | 10 | 10 | 10 | 10 | 10 | 10 |
| Water | 0 | 0.5 | 0.5 | 1 | 1 | 1.5 | 1.5 |
| Molecular Sieve (type 3A) | 4 | 4 | 6 | 4 | 8 | 6 | 7 |

| | Test Number | | | | |
| --- | --- | --- | --- | --- | --- |
| | 8 | 9 | 10 | 11 | 12 |
| LP32c | 100 | 100 | 100 | 100 | 100 |
| Calcium Peroxide | 10 | 10 | 10 | 10 | 10 |
| Water | 1.5 | 2 | 2 | 2 | 2 |
| Molecular Sieve (type 3A) | 10 | 4 | 7 | 10 | 12 |

In each system the molecular sieve was added 20 minutes before the end of the induction period as determined in Experiment 2.

| Stability Trial Results | | | | | | |
| --- | --- | --- | --- | --- | --- | --- |
| | Formulation No. | | | | | |
| | 1. | 2 | 3 | 4 | 5 | 6 |
| Viscosity initial Pa.S. | 87.2 | 109 | 93 | 104 | 136 | 114 |
| After 6 months ageing | 203 | 203 | 105 | 203 | cured | 251 |
| Time to Cure | — | — | — | 13 days | — | 13 days |

| | Formulation No. | | | | |
| --- | --- | --- | --- | --- | --- |
| | 7 | 8 | 9 | 10 | 11 | 12 |
| Viscosity initial Pa.s. | 124 | 152 | 169 | 131 | 152 | 147 |
| After 6 months ageing | cured | 324 | cured | cured | cured | 1046 |
| Time to Cure | 7 days | — | 4 days | 3 days | 5 days | — |

It can be seen that it is possible to make a prereacted polysulphide that remains liquid for periods in excess of 6 months. The level of added water and subsequent addition of molecular sieve have a marked effect on stability. The experiment demonstrates that it is necessary to incorporate the effective absorption level of molecular sieve (20% by weight) on available water in order to render the system stable.

EXAMPLE 9

Effect of Temperature

Figure 8:
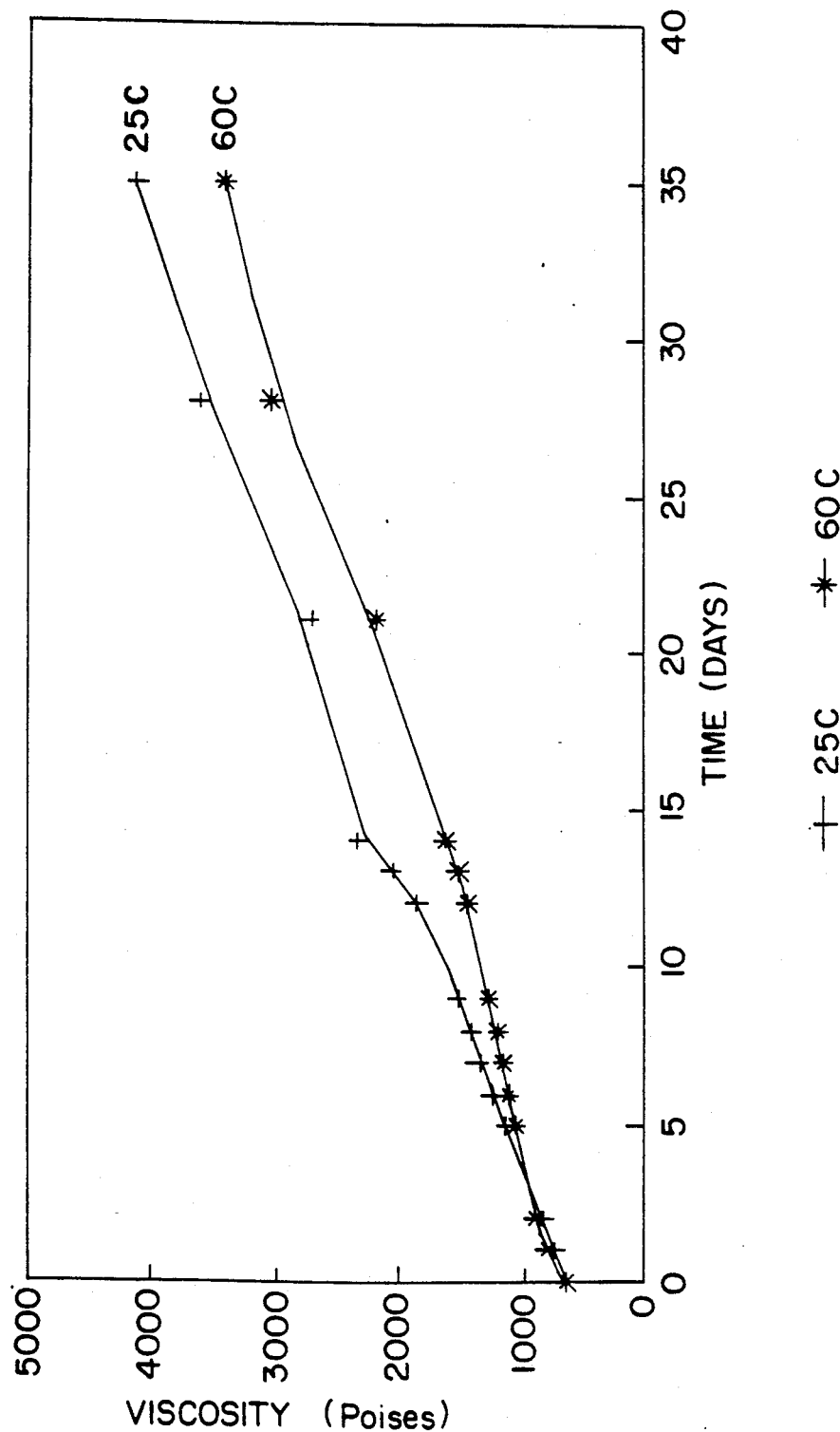
FIG. 8 shows curing rates for systems at two different temperatures.
Figure 9:
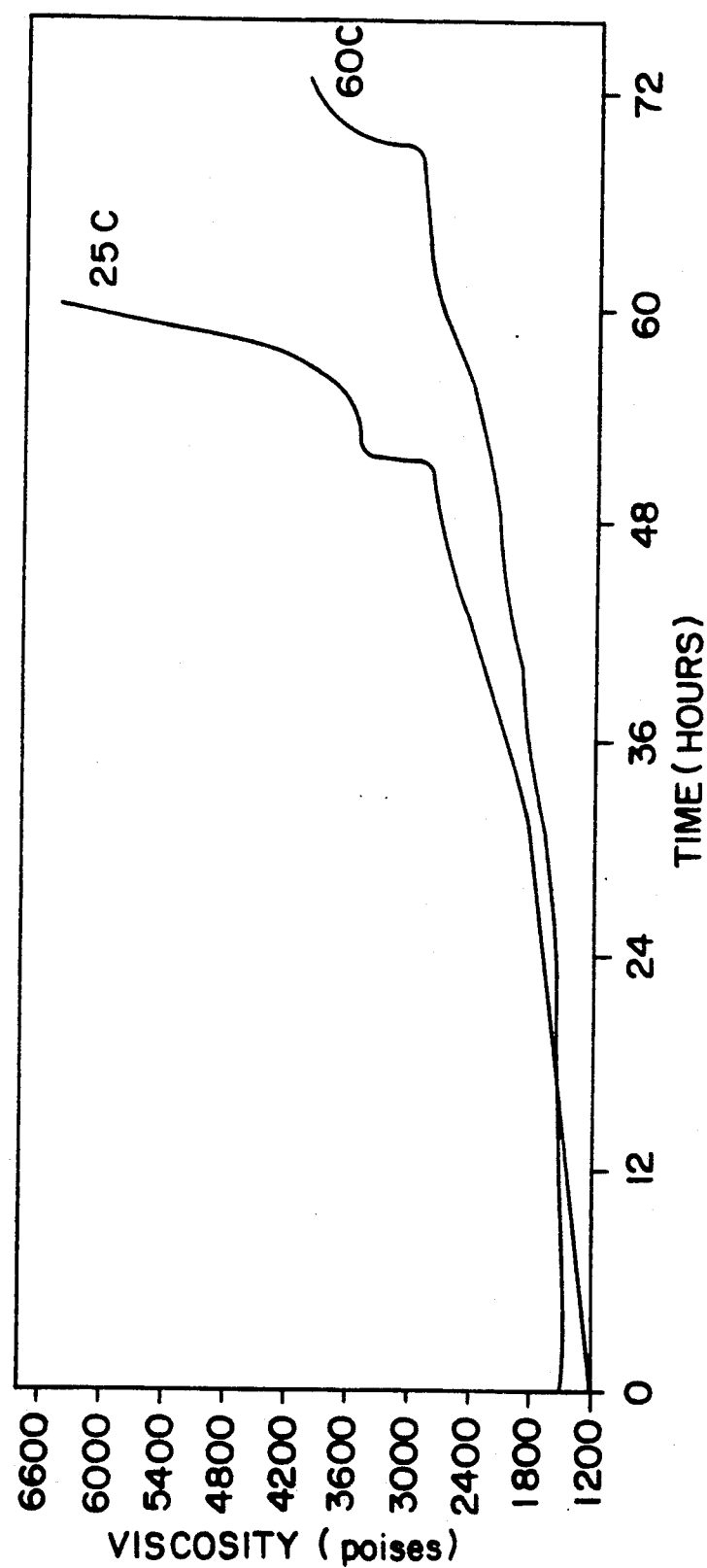
FIG. 9 is a worklife curve for a prereacted LP system.

Examples 1-8 were carried out at ambient temperature. To determine the effect of temperature on the preparation of prereacted polysulphides the following prereacted system was prepared LP32c—100 pbw calcium peroxide—10 pbw and stored at different temperatures for 4 hours. It was found that peak instability was at 45° C. It was also unexpectantly found that at 60° C. the prereacted system remained as stable as the sample at 25° C. Thus where it is not possible to make the prereaction at below 25° C., it is possible to make it at 60° C. (FIG. 8). In both cases, on exposure cure progressed immediately. The same conditioned at 60° C. being slower than the sample at 25° C. (FIG. 9).

EXAMPLE 10

Calcium Peroxide Paste for Prereaction

For ease of manufacture of the prereacted polysulphide, a paste of calcium peroxide with a plasticizer is used. The paste is easily dispersed in the liquid polymer. This removes the need to grind the polymer and the calcium peroxide powder together, which might bring about undesirable side reactions.

Three plasticizers were evaluated:

Santicizer 160—butyl benzyl phthalate—Monsanto Ltd.

KMCC—trisopropyl naphthenate—Rutgers GmbH

Actrel 400—aromatic substituted naphthenate—Exxon Chemicals Ltd.

After manufacture, the stability of the prereacted polymers based on these pastes was checked at 25° C. and 60° C.

| | Plasticizer | | | | | |
| --- | --- | --- | --- | --- | --- | --- |
| | Actrel 400 | | KMC | | Santicizer 160 | |
| | Test temp. | | | | | |
| Viscosity (poise) | 25° | 60° | 25° | 60° | 25° | 60° |
| initial | 547 | 510 | 483 | 483 | 510 | 494 |
| 7 days | 765 | 617 | 684 | 567 | 557 | 540 |
| 49 days | 1760 | 1130 | 1553 | 1035 | 713 | 666 |
| 100 days | 1604 | 1121 | 1355 | 1137 | 529 | 542 |

The effect of the plasticizer on the cure activity with the prereacted polymer was checked by adding additional calcium peroxide and following viscosity increase. It was observed that the two napthenate derivatives gave an acceleration to the rate of cure (for the sample stored at 25° C.).

EXAMPLE 11

To demonstrate the effectiveness of the prereaction treatment of the liquid polysulphide in promoting faster cure, the following formulations were prepared.

|  | A. | B. |
| --- | --- | --- |
| Prereacted LP | 118 | — |
| Untreated LP | — | 118 |
| Filler A | 65 | 65 |
| Pigment | 20 | 20 |
| Filler B | 5 | 5 |
| Filler C | 110 | 110 |
| Plasticizer | 48 | 48 |
| Adhesion promoter | 1 | 1 |
| Desiccant | 5 | 5 |
| Curing paste | 17 | 17 |

The rates of skin formation at 25° C., 50% relative humidity (RH) were

|  | A. | B. |
| --- | --- | --- |
| 3 days | tack free | tacky |
| 8 days | skin | tack free |

The rates of skin formation outdoors (winter) were

|  | A. | B. |
| --- | --- | --- |
| 1 day | tack free | tack free |
| 2 days | 2 mm skin | thin skin |
| 5 days | 3 mm skin | 1 mm skin |
| 6 days | 5 mm skin | 1.5 mm skin |

EXAMPLE 12

Using the same formulation as Experiment 11, but with a level of calcium peroxide in the curing paste near to stoichiometry (with respect to liquid polysulphide) the following rates of cure were obtained (outdoors, winter).

|  | with prereacted LP | with untreated LP |
| --- | --- | --- |
| 1 day | skinned | tacky |
| 3 days | 2 mm skin | tacky |
| 4 days | 2 mm skin | tack free |

EXAMPLE 13

The effect of time of prereaction and type of prereaction were evaluated using the following resin systems:

|  | A. | B. | C. |
| --- | --- | --- | --- |
| LP-32c | 100 | 100 | 100 |
| Calcium peroxide | 4 | 4 | 4 |
| water | — | — | 1.5 |

-continued

|  | A. | B. | C. |
| --- | --- | --- | --- |
| desiccant | — | — | 8 |

System A was formulated immediately without prereaction; System B was allowed to prereact for 3 days before formulating; in system C the reaction was allowed to proceed for 4 hours before the desiccant was added to kill further reaction.

The resins were made into single component sealants using the formulation and cure pastes described in Example 10.

The relative rates of cure were then measured at 25° C., 50% RH.

|  | A. | B. | C. |
| --- | --- | --- | --- |
| 1 day | tacky | tacky | tack free |
| 5 days | tacky | tack free | tack free |
| 17 days | tack free | tack free | tack free |

The relative rates of cure outdoors (winter) were-C fully cured in 1 day, B fully cured in 5 days and A fully cured in 7 days.

We claim:

1. A method of curing a polysulphide composition, said cure comprises an induction stage, a chain extension stage, and a final cure stage, wherein a prepolymer having free mercaptan groups is mixed with a water activatable curing agent, wherein the composition is subjected to a partial cure with water, the reaction then being stopped by dehydration.

2. A method according to claim 1, wherein the prepolymer is a liquid polysulphide having the general formula: $HS-(CH_2-CH_2-O-CH_2-O-CH_2-CH_2-S_x)_n-CH_2-CH_2-O-CH_2-O-CH_2-CH_2-SH$ wherein x is from 2 to 5 and n is from 10 to 45.

3. A method according to claim 2, wherein the polysulphide has a branching level of 0 to 4%.

4. A method according to claim 1 wherein the curing agent is an inorganic peroxide.

5. A method according to claim 4, wherein the curing agent is calcium or sodium peroxide.

6. A method according to claim 1 wherein the amount of curing agent used is from 4 to 10 wt. parts per 100 wt. parts of the prepolymer.

7. A method according to claim 1, wherein the dehydration is achieved using a molecular sieve desiccant.

8. A method according to claim 1 wherein a plasticizer is added to the system.

9. A method according to claim 8 wherein the plasticizer is added in the form of a paste with the curing agent.

10. A method according to claim 1 wherein the partial cure is stopped at from 0 to 20 minutes before the end of the induction stage, before the viscosity of the system rises.

* * * * *